(12) United States Patent
Ganireddy et al.

(10) Patent No.: US 10,763,674 B2
(45) Date of Patent: Sep. 1, 2020

(54) SYSTEM AND METHOD FOR CONTROLLING CLUSTER-BASED WIND FARMS

(71) Applicant: General Electric Company, Schenectady, NY (US)

(72) Inventors: Govardhan Ganireddy, Roanoke, VA (US); Rajni Kant Burra, Clifton Park, NY (US); Deepak Raj Sagi, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/719,923

(22) Filed: Sep. 29, 2017

(65) Prior Publication Data

US 2019/0103747 A1    Apr. 4, 2019

(51) Int. Cl.
*G05B 11/01* (2006.01)
*H02J 3/38* (2006.01)
(Continued)

(52) U.S. Cl.
CPC ............ *H02J 3/386* (2013.01); *F03D 7/0284* (2013.01); *F03D 7/048* (2013.01); *F03D 9/257* (2017.02);
(Continued)

(58) Field of Classification Search
None
See application file for complete search history.

(56) References Cited

U.S. PATENT DOCUMENTS 3,593,106 A    7/1971  Lafuze
4,281,371 A    7/1981  Baker
(Continued)

FOREIGN PATENT DOCUMENTS

EP         1276219 A1     1/2003
WO    WO2009/138808 A1   11/2009

OTHER PUBLICATIONS

U.S. Appl. No. 15/490,079, filed Apr. 18, 2017.
(Continued)

*Primary Examiner* — Thomas C Lee
*Assistant Examiner* — Gary Collins
(74) *Attorney, Agent, or Firm* — Dority & Manning, P.A.

(57) ABSTRACT

An electrical power system includes a system-level controller and a plurality of clusters of subsystems defining a stator power path and a converter power path for providing power to the power grid. The converter power path includes a partial power transformer. The system further includes a cluster transformer connecting each cluster to the power grid and a plurality of cluster-level controllers communicatively coupled with the system-level controller. Each of the clusters is communicatively coupled with one of the cluster-level controllers. Thus, the system-level controller regulates system-level active and/or reactive power based on required active or reactive power for the system, respectively, and compares the system-level active or reactive power with preferred values thereof. Further, the system-level controller receives feedback signal(s) from the cluster-level controllers, generates cluster-level power command(s) based on the comparison and the feedback signal(s), and sends the cluster-level power commands to the cluster-level controllers.

20 Claims, 13 Drawing Sheets

(51) Int. Cl.
*H02K 1/22* (2006.01)
*H02K 1/12* (2006.01)
*F03D 9/25* (2016.01)
*G05B 15/02* (2006.01)
*F03D 7/02* (2006.01)
*H02J 3/46* (2006.01)
*F03D 7/04* (2006.01)
*H02J 3/18* (2006.01)
*H02P 9/00* (2006.01)

(52) U.S. Cl.
CPC .............. *G05B 11/01* (2013.01); *G05B 15/02* (2013.01); *H02J 3/1842* (2013.01); *H02J 3/46* (2013.01); *H02K 1/12* (2013.01); *H02K 1/22* (2013.01); *F05B 2270/1033* (2013.01); *F05B 2270/335* (2013.01); *G05B 2219/2619* (2013.01); *H02P 9/007* (2013.01)

(56) References Cited

U.S. PATENT DOCUMENTS

| | | |
|---|---|---|
| 5,047,910 A | 9/1991 | Levran et al. |
| 7,119,452 B2 | 10/2006 | Larsen |
| 7,166,928 B2 | 1/2007 | Larsen |
| 7,187,566 B2 | 3/2007 | Kawashima et al. |
| 7,212,421 B2 | 5/2007 | Chandra et al. |
| 7,224,081 B2 | 5/2007 | Larsen |
| 7,521,907 B2 | 4/2009 | Cervera et al. |
| 7,839,024 B2 * | 11/2010 | Cardinal ............ F03D 7/0284 307/84 |
| 7,923,862 B2 | 4/2011 | Cardinal et al. |
| 8,013,580 B2 | 9/2011 | Cervera et al. |
| 8,041,465 B2 | 10/2011 | Larsen et al. |
| 8,659,178 B2 | 2/2014 | Arlaban Gabeiras et al. |
| 8,669,669 B1 | 3/2014 | Wagoner et al. |
| 8,736,241 B2 | 5/2014 | Cervera et al. |
| 9,537,437 B2 | 1/2017 | Wagoner et al. |
| 9,587,626 B2 | 3/2017 | Sadaba et al. |
| 2004/0212497 A1 * | 10/2004 | Stilp ...................... G08B 25/10 340/539.17 |
| 2009/0218817 A1 * | 9/2009 | Cardinal ............... F03D 7/028 290/44 |
| 2010/0094474 A1 * | 4/2010 | Larsen .................... H02J 3/16 700/287 |
| 2010/0256829 A1 * | 10/2010 | Alonso Sadaba ..... F03D 7/0272 700/287 |
| 2011/0187106 A1 * | 8/2011 | Ichinose ................ F03D 7/048 290/44 |
| 2012/0101643 A1 | 4/2012 | Kirchner et al. |
| 2012/0136494 A1 * | 5/2012 | Kirchner ................ H02J 3/16 700/287 |
| 2013/0162043 A1 * | 6/2013 | Ellena ..................... H02J 3/16 307/43 |
| 2013/0286692 A1 | 10/2013 | Patel et al. |
| 2013/0289911 A1 | 10/2013 | Patel et al. |
| 2014/0001763 A1 | 1/2014 | Kragelund et al. |
| 2014/0081473 A1 * | 3/2014 | Bengtson ............... F03D 7/047 700/287 |
| 2014/0197639 A1 * | 7/2014 | Bala ...................... H02J 3/386 290/54 |
| 2014/0253058 A1 | 9/2014 | Cervera et al. |
| 2014/0320056 A1 | 10/2014 | Royak et al. |
| 2015/0260162 A1 * | 9/2015 | Pan ......................... H02J 3/34 307/73 |
| 2015/0267683 A1 | 9/2015 | Ubben et al. |
| 2016/0333856 A1 * | 11/2016 | Zabalza ................. H02H 7/06 |

OTHER PUBLICATIONS

Chinese Patent Application No. 201710312375.5 filed on May 5, 2017.

Baron et al., Breaking the 34.5kV Standard, Drawing on hydro experience, Acciona extols use of 12kV collection system to lower energy costs through elimination of step-up transformers, Wind Systems Magazine, Apr. 2013, pp. 48-54.

Olonso Sadaba et al., Wind Generation Control Strategies for Grid Integration Acciona Windpower Experience, ResearchGate, Acciona Windpower, S.A., uploaded 2015, 11 Pages. https://www.researchgate.net/publications/267966410.

Extended European Search Report and Opinion issued in connection with corresponding EP Application No. 18196041.0 dated Dec. 13, 2018.

* cited by examiner

SYSTEM AND METHOD FOR CONTROLLING CLUSTER-BASED WIND FARMS

FIELD

The present disclosure relates generally to systems and methods for controlling wind turbines, and more particularly, to systems and methods for controlling cluster-based wind farms.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

For example, FIGS. 1 and 2 illustrate a wind turbine 10 and associated power system suitable for use with the wind turbine 10 according to conventional construction. As shown, the wind turbine 10 includes a nacelle 14 that typically houses a generator 28 (FIG. 2). The nacelle 14 is mounted on a tower 12 extending from a support surface (not shown). The wind turbine 10 also includes a rotor 16 that includes a plurality of rotor blades 20 attached to a rotating hub 18. As wind impacts the rotor blades 20, the blades 20 transform wind energy into a mechanical rotational torque that rotatably drives a low-speed shaft 22. The low-speed shaft 22 is configured to drive a gearbox 24 (where present) that subsequently steps up the low rotational speed of the low-speed shaft 22 to drive a high-speed shaft 26 at an increased rotational speed. The high-speed shaft 26 is generally rotatably coupled to a generator 28 (such as a doubly-fed induction generator or DFIG) so as to rotatably drive a generator rotor 30. As such, a rotating magnetic field may be induced by the generator rotor 30 and a voltage may be induced within a generator stator 32 that is magnetically coupled to the generator rotor 30. The associated electrical power can be transmitted from the generator stator 32 to a main three-winding transformer 34 that is typically connected to a power grid via a grid breaker 36. Thus, the main transformer 34 steps up the voltage amplitude of the electrical power such that the transformed electrical power may be further transmitted to the power grid.

In addition, as shown, the generator 28 is typically electrically coupled to a bi-directional power converter 38 that includes a rotor-side converter 40 joined to a line-side converter 42 via a regulated DC link 44. The rotor-side converter 40 converts the AC power provided from the rotor 30 into DC power and provides the DC power to the DC link 44. The line side converter 42 converts the DC power on the DC link 44 into AC output power suitable for the power grid. Thus, the AC power from the power converter 38 can be combined with the power from the stator 32 to provide multi-phase power (e.g. three-phase power) having a frequency maintained substantially at the frequency of the power grid (e.g. 50 Hz/60 Hz).

The illustrated three-winding transformer 34 typically has (1) a 33 kilovolt (kV) medium voltage (MV) primary winding 33 connected to the power grid, (2) a 6 to 13.8 kV MV secondary winding 35 connected to the generator stator 32, and (3) a 690 to 900 volt (V) low-voltage (LV) tertiary winding 37 connected to the line-side power converter 42.

Referring now to FIG. 3, individual power systems of a plurality of wind turbines 10 may be arranged in a predetermined geological location and electrically connected together to form a wind farm 46. More specifically, as shown, the wind turbines 10 may be arranged into a plurality of groups 48 with each group separately connected to a main line 50 via switches 51, 52, 53, respectively. In addition, as shown, the main line 50 may be electrically coupled to another, larger transformer 54 for further stepping up the voltage amplitude of the electrical power from the groups 48 of wind turbines 10 before sending the power to the grid.

With the growing success of wind power production in recent years, this form of power has gained significant market share. As wind power includes variations and is not a power source having a timely constant power output (e.g. due to variations of the wind speed), operators of power distribution networks have to take this into account. One of the consequences is, for example, that the distribution and transmission networks have become more difficult to manage. This pertains also to the management of the amount of reactive power flow in a network.

Referring now to FIGS. 4 and 5, schematic diagrams of a farm-level reactive power control scheme and a turbine-level reactive power control scheme are illustrated, respectively, according to conventional construction. More specifically, as shown in FIG. 4, the farm-level control scheme includes a fast inner voltage magnitude loop 58 and a slow outer reactive power loop 56. Further, as shown, the farm-level controller alternates between voltage control and reactive power control via switch 64. For voltage control, the farm-level controller receives a voltage set point 66 and limits the set point via a slew rate limiter 68. For reactive power control, the farm-level controller regulates the reactive power via a VAR regulator 70 based on a reactive power set point 72 and a reactive power feedback signal $Q_{FBK}$. The farm-level controller then limits either the voltage or reactive power signal that enters the fast inner voltage magnitude loop 58. As shown at 74, another voltage regulator 74 regulates the voltage signal to determine a reactive power command for the wind farm. The farm-level controller then distributes the net reactive power command (i.e. $Q_{CMD1}$, $Q_{CMD2}$, $Q_{CMDn}$, and so on) to the individual wind turbines 102 (i.e. $10_1$, $10_2$, to $10_n$ and so on).

At the turbine level, as shown in FIG. 5, there is another volt/VAR control loop that consists of a faster inner magnitude loop 62 and a slower outer reactive power loop 60. Further, the three-winding transformer 34 of each wind turbine 10 provides a certain impedance that allows the wind turbines 10 in the wind farm 46 to regulate the voltage at the secondary winding of the three-winding transformer 34. This in turn enables regulating the voltage at the point of interconnection (POI) (also referred to as the point of common coupling (POCC)). Thus, the faster inner magnitude loop 62 provides the grid with fast voltage magnitude support for transient events, while the slower outer reactive power loop 60 provides VAR balance between the wind turbines 10 in steady state.

In such systems, however, the three-winding transformers 34 associated with each wind turbine 10 is expensive. Particularly, the secondary winding 35 of the transformer 34 that is connected to the generator stator 32 can be costly.

Thus, it would be advantageous to eliminate such three-winding transformers from wind turbine power systems.

Thus, it would be advantageous to provide a wind farm having a plurality of wind turbines without the three-winding transformer described above, but that maintains the systems' ability to control reactive power.

BRIEF DESCRIPTION

Aspects and advantages of the invention will be set forth in part in the following description, or may be obvious from the description, or may be learned through practice of the invention.

In one aspect, the present subject matter is directed to an electrical power system connected to a power grid. The electrical power system includes a system-level controller and a plurality of clusters of electrical power subsystems. Each of the electrical power subsystems includes a power converter electrically coupled to a generator having a generator rotor and a generator stator. Further, each of the electrical power subsystems defines a stator power path and a converter power path for providing power to the power grid. In addition, the converter power path includes a partial power transformer. The electrical power system further includes a cluster transformer connecting each cluster of electrical power subsystems to the power grid and a plurality of cluster-level controllers communicatively coupled with the system-level controller. Each of the clusters of electrical power subsystems is communicatively coupled with one of the cluster-level controllers. The system-level controller is configured to perform one or more operations, including but not limited to regulating at least one of a system-level active power or a system-level reactive power based on required active power and required reactive power for the electrical power system, respectively, comparing at least of the system-level active power or the system-level reactive power with preferred values for the system-level active power and the system-level reactive power, respectively, receiving one or more feedback signals from at least one of the cluster-level controllers, generating one or more cluster-level power commands based on the comparison and the one or more feedback signals, and sending the one or more cluster-level power commands to each of the cluster-level controllers.

In another aspect, the present subject matter is directed to a method for controlling an electrical power system. The electrical power system has a plurality of clusters of electrical power subsystems with a cluster transformer connecting each cluster of electrical power subsystems to a power grid. Each of the electrical power subsystems defines a stator power path and a converter power path for providing power to the power grid. The converter power path contains a partial power transformer. The method includes selecting one of a plurality of cluster-level controllers as a master controller in the event that a system-level controller is offline. Further, the method includes regulating, via the master controller, at least one of a system-level active power or a system-level reactive power based on required active power and required reactive power for the electrical power system, respectively. The method also includes comparing, via the master controller, at least of the system-level active power or the system-level reactive power with preferred values for the system-level active power and the system-level reactive power, respectively. Moreover, the method includes generating, via the master controller, one or more cluster-level power commands based on the comparison and the one or more feedback signals. In addition, the method includes consecutively sending, via the master controller, the one or more cluster-level power commands to the remaining cluster-level controllers. It should be understood that the method may further include any of the additional steps and/or features as described herein.

In yet another aspect, the present subject matter is directed to a method for controlling an electrical power system. The electrical power system has a plurality of clusters of electrical power subsystems with a cluster transformer connecting each cluster of electrical power subsystems to a power grid. Each of the electrical power subsystems defines a stator power path and a converter power path for providing power to the power grid. The converter power path contains a partial power transformer. The method includes regulating, via a system-level controller, at least one of a system-level active power or a system-level reactive power based on required active power and required reactive power for the electrical power system, respectively. Further, the method includes comparing, via the system-level controller, at least of the system-level active power or the system-level reactive power with preferred values for the system-level active power and the system-level reactive power, respectively. The method also includes receiving, via the system-level controller, one or more feedback signals from a plurality of cluster-level controllers, each of the clusters of electrical power subsystems communicatively coupled to one of the cluster-level controllers. Moreover, the method includes generating, via the system-level controller, one or more cluster-level power commands based on the comparison and the one or more feedback signals. As such, the method includes sending, via the system-level controller, the one or more cluster-level power commands to each of the cluster-level controllers. It should be understood that the method may further include any of the additional steps and/or features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
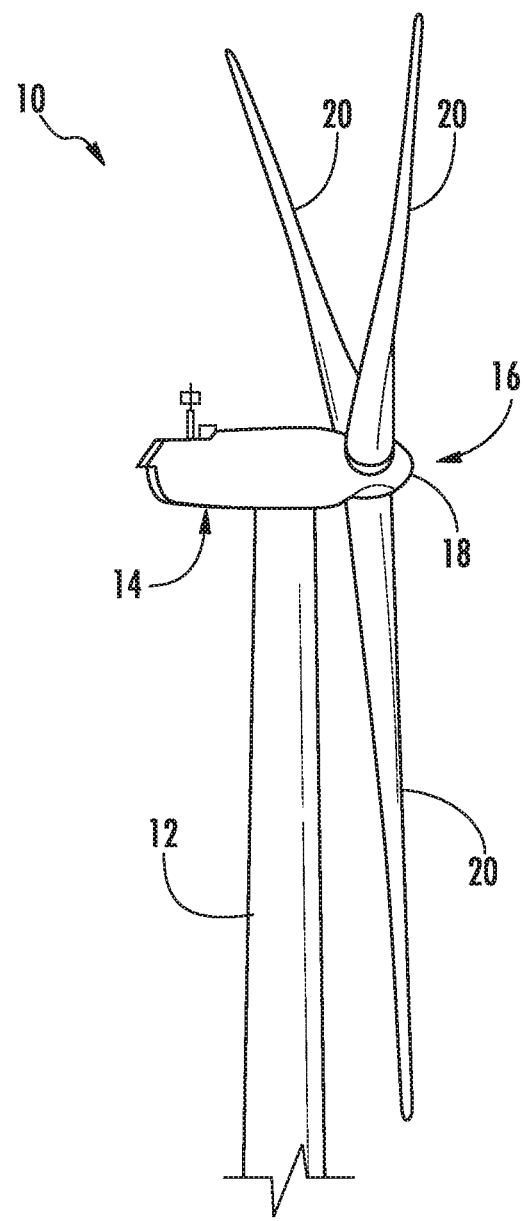
FIG. 1 illustrates a perspective view of a portion of one embodiment of a wind turbine according to conventional construction.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
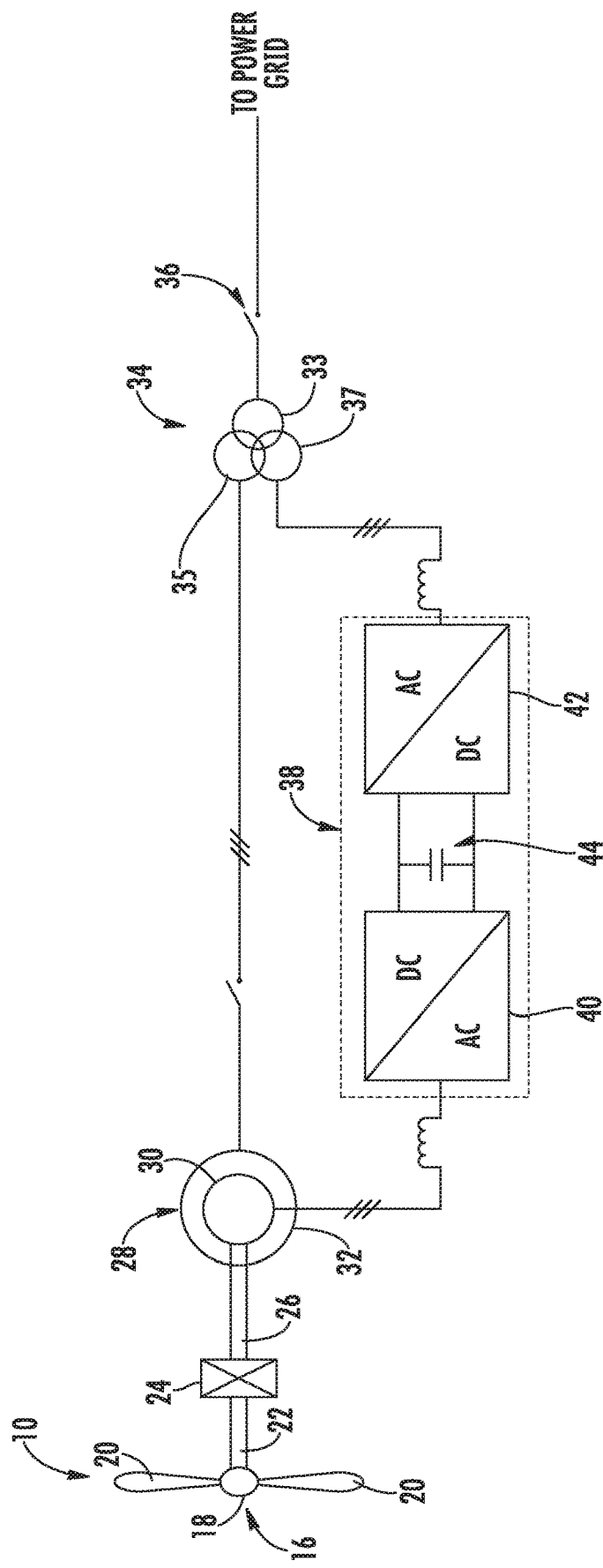
FIG. 2 illustrates a schematic diagram of a conventional electrical power system suitable for use with the wind turbine shown in FIG. 1.

Generally, the present disclosure provides an improved electrical power system that eliminates the 50/60 Hertz (Hz) stator winding in the pad-mount transformer (e.g. the main transformer 34 of FIG. 2) used in conventional systems and instead uses two or more groups of wind turbines connected at a common cluster transformer. In this configuration, the power converter of each wind turbine power system is still a low-voltage rated converter and is connected to the stator via an 690V/6 kV or 13.8 kV internal partial power transformer. In this new arrangement, the collector system includes multiple clusters with two or more group of wind turbines in each cluster. Each cluster has its own small substation with a step-up transformer from medium voltage to high voltage. In such a cluster configuration, it is possible to control the groups individually to meet a common farm-level goal, such as active power control, voltage/VAR control. etc. Further, the inclusion of a controller at the cluster level provides the capability of regulating clusters within the farm, as opposed to the central farm controller attempting to control each wind turbine individually.

As such, the present disclosure provides many advantages not present in the prior art. For example, the system and method of the present disclosure can reduce communication latencies and network traffic, hence improving the control response of the wind farm. In addition, cluster-level control can also help meet challenging active power control requirements based on frequency response which may otherwise result in undesirable (excessive curtailment) farm control response. Further, cluster-level analytics, such as monitoring cluster transformer health, processing turbine performance and taking control actions, are possible, where otherwise the traditional farm-level control is limited by bandwidth, processing capability, etc.

More specifically, the cluster-type configuration of a wind farm provides an advantage for a specific form of active power regulation based on grid frequency change. This is commonly referred to as primary frequency response or frequency droop. In certain grids, due to the reduced frequency dead-band, there are increased occurrences of frequency deviation events requiring a response from wind farms. At times, the magnitude of curtailment required may be small as compared to the total power being generated in the farm. In such situations, there can be control challenges in the conventional farm control design where every turbine in the farm is proportionately curtailed regardless of the magnitude of the power curtailment that is required. This can lead to over-curtailment and consequently a loss of energy. In such situations, where the magnitude of curtailment necessary is 'small', only a few clusters can be used to meet the power reduction requirement, leaving others producing uncurtailed power. In addition, the overall reliability of the architecture of the present disclosure is higher compared to the non-cluster based architecture (which includes a wind farm controller communicating directly to individual wind turbines). The solution also reduces network traffic and hence can enable the operation and control of larger farms (i.e. having a greater number of wind turbines), or as a pivot, can reduce the bandwidth requirement on the farm network. Individual cluster control is also valuable in situations where frequency response is required during low power conditions, where a few cluster(s) may be selectively used to meet the power requirement instead of controlling all the wind turbines within the wind farm.

Figure 6:
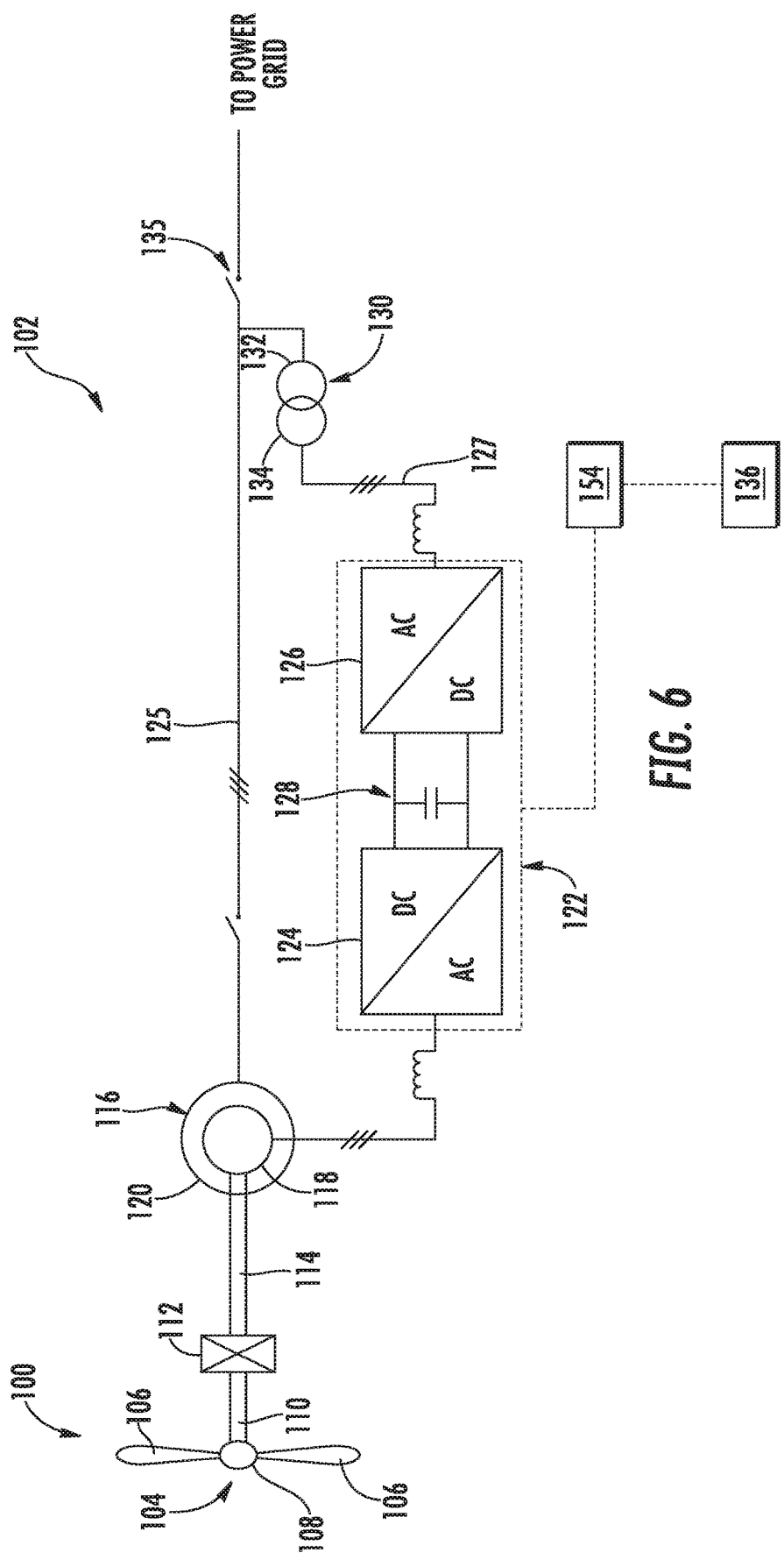
FIG. 6 illustrates a schematic diagram of one embodiment of an electrical power system for a wind turbine according to the present disclosure.

Referring now to FIG. 6, a schematic diagram of one embodiment of an electrical power subsystem 102 according to the present disclosure is illustrated. It should be understood that the term "subsystem" is used herein to distinguish between the individual power systems (e.g. as shown in FIG. 6) and the overall electrical power system 105 of FIG. 7 that includes a plurality of electrical power subsystems 102. Those of ordinary skill in the art, however, will recognize that the electrical power subsystem 102 of FIG. 6 may also be referred to more generically, such as a simply a system (rather than a subsystem). Therefore, such terms may be used interchangeably and are not meant to be limiting.

Further, as shown, the electrical power subsystem 102 may correspond to a wind turbine power system 100. More specifically, as shown, the wind turbine power system 100 includes a rotor 104 that includes a plurality of rotor blades 106 attached to a rotating hub 108. As wind impacts the rotor blades 106, the blades 106 transform wind energy into a mechanical rotational torque that rotatably drives a low-speed shaft 110. The low-speed shaft 110 is configured to drive a gearbox 112 that subsequently steps up the low rotational speed of the low-speed shaft 110 to drive a high-speed shaft 114 at an increased rotational speed. The high-speed shaft 114 is generally rotatably coupled to a doubly-fed induction generator 116 (referred to hereinafter as DFIG 116) so as to rotatably drive a generator rotor 118. As such, a rotating magnetic field may be induced by the generator rotor 118 and a voltage may be induced within a generator stator 120 that is magnetically coupled to the generator rotor 118. In one embodiment, for example, the generator 116 is configured to convert the rotational mechanical energy to a sinusoidal, three-phase alternating current (AC) electrical energy signal in the generator stator 120. Thus, as shown, the associated electrical power can be transmitted from the generator stator 120 directly the grid.

Figure 3:
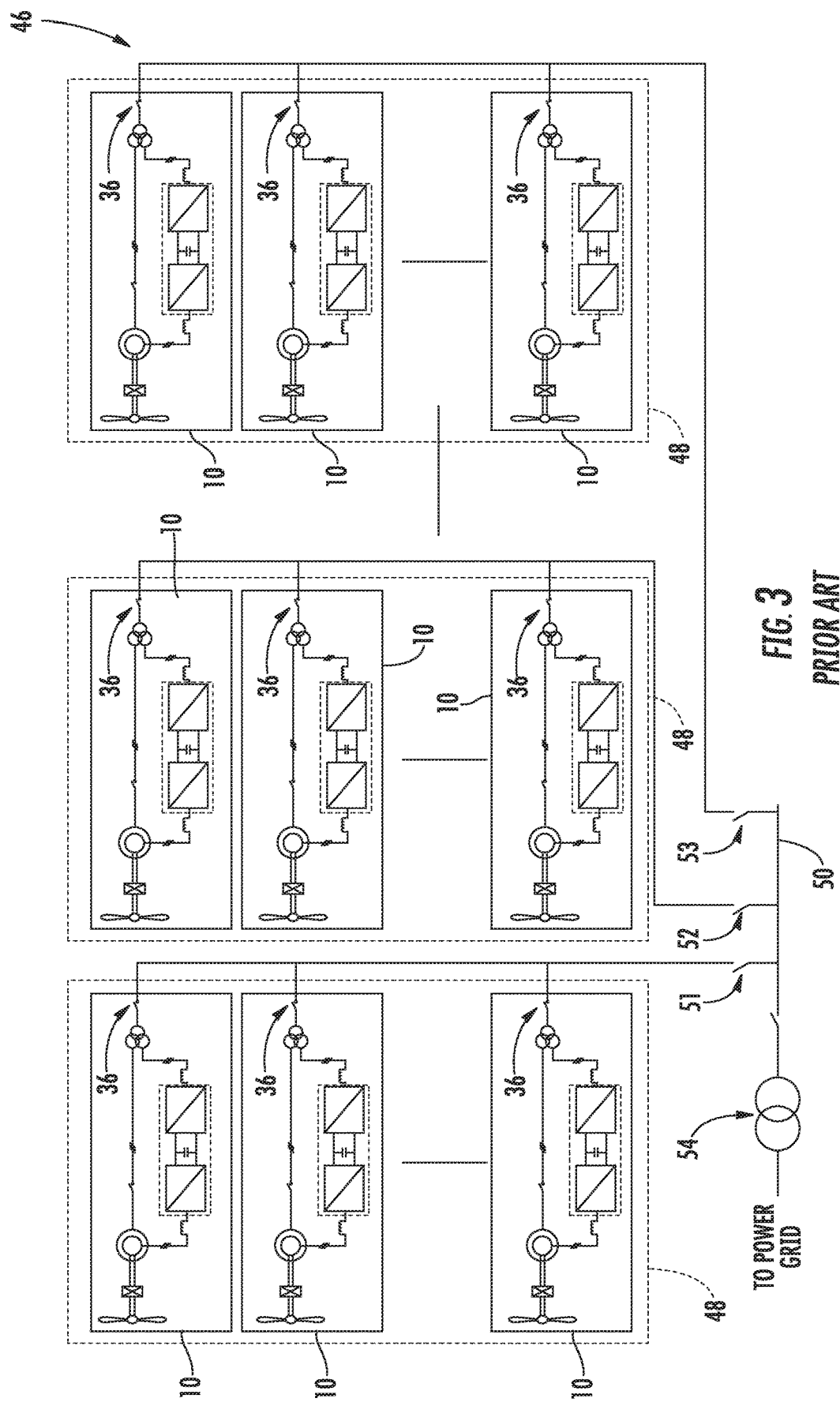
FIG. 3 illustrates a schematic diagram of one embodiment of a conventional wind farm according to conventional construction, particularly illustrating a plurality of wind turbine power systems such as those illustrated in FIG. 2 connected to a single sub-station transformer.

In addition, as shown, the generator 116 is electrically coupled to a bi-directional power converter 122 that includes a rotor-side converter 124 joined to a line-side converter 126 via a regulated DC link 128. Thus, the rotor-side converter 124 converts the AC power provided from the generator rotor 118 into DC power and provides the DC power to the DC link 128. The line side converter 126 converts the DC power on the DC link 128 into AC output power suitable for the power grid. More specifically, as shown, the AC power from the power converter 122 can be combined with the power from the generator stator 120 via a converter power path 127 and a stator power path 125, respectively. For example, as shown, and in contrast to conventional systems such as those illustrated in FIGS. 1-3, the converter power path 127 may include a partial power transformer 130 for stepping up the voltage amplitude of the electrical power from the power converter 122 such that the transformed electrical power may be further transmitted to the power grid. Thus, as shown, the illustrated system 102 of FIG. 6 does not include the conventional three-winding main transformer described herein. Rather, as shown in the illustrated embodiment, the partial power transformer 130 may correspond to a two-winding transformer having a primary winding 132 connected to the power grid and a secondary winding 134 connected to the rotor side converter 124.

Figure 7:
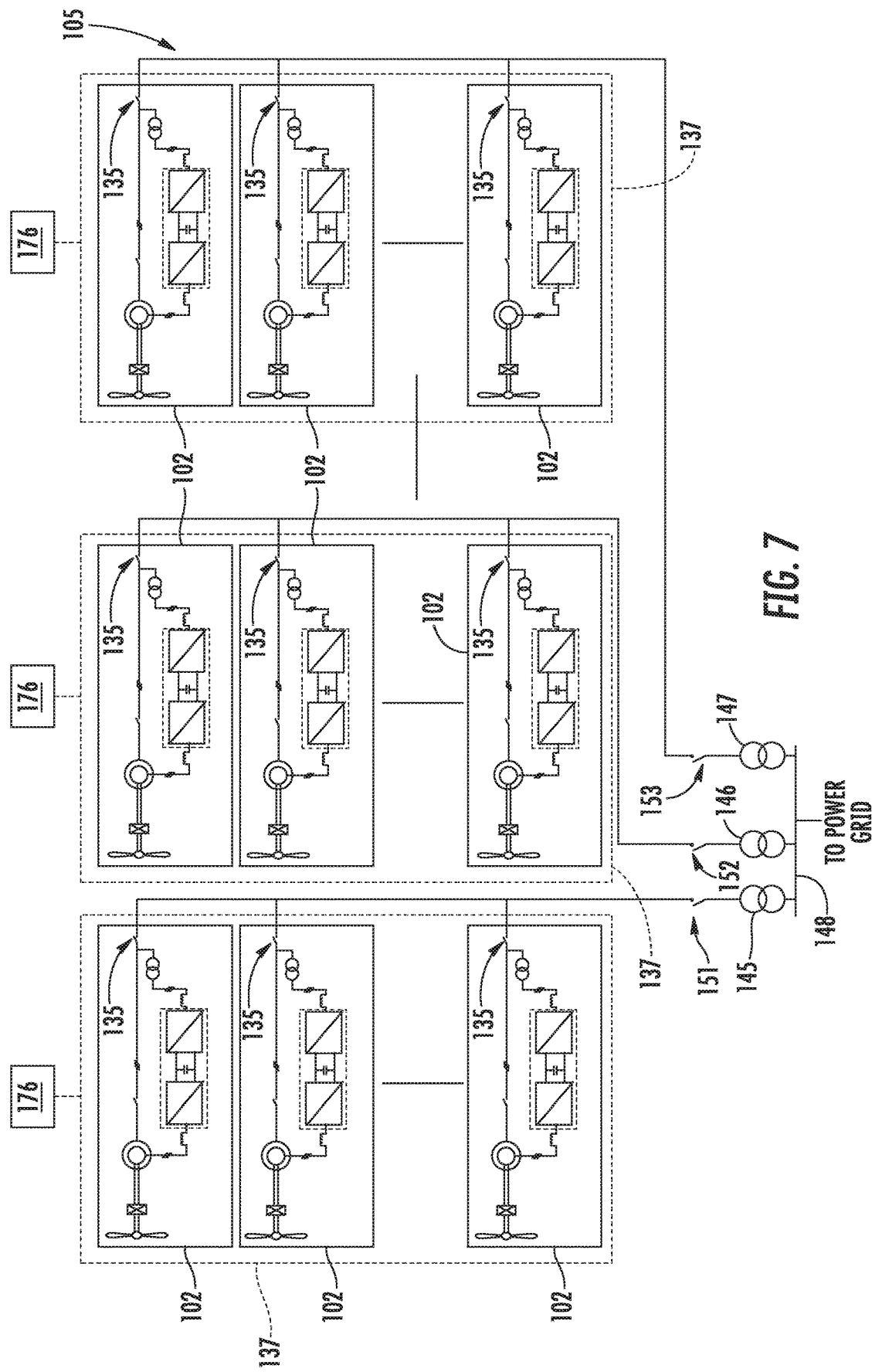
FIG. 7 illustrates a schematic diagram of one embodiment of a wind farm according to the present disclosure, particularly illustrating a plurality of wind turbine clusters each connected to the grid via a cluster transformer.
Figure 8:
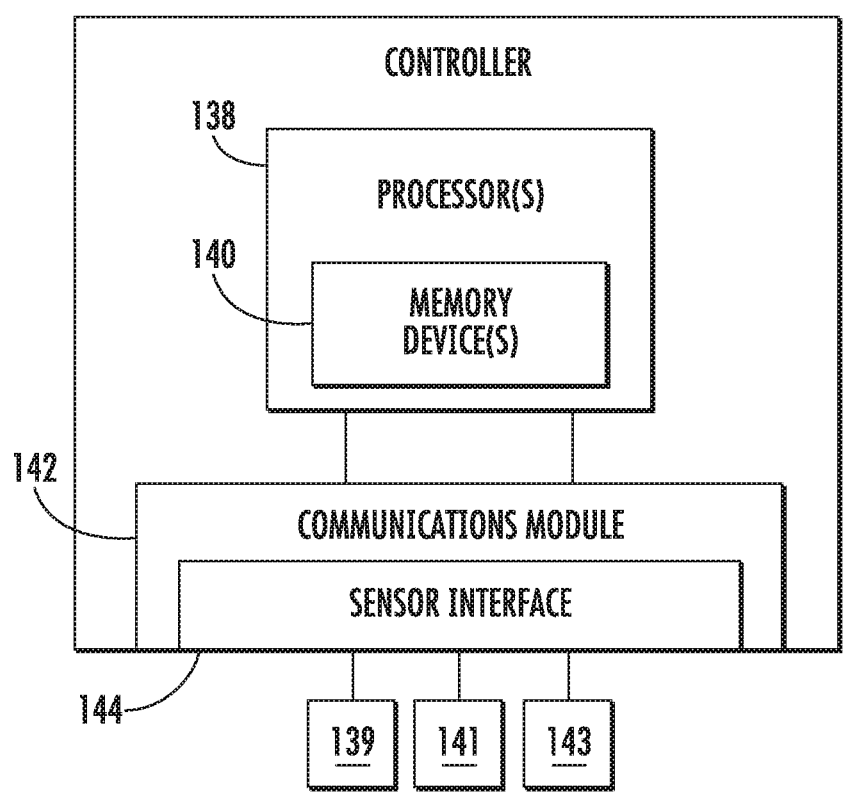
FIG. 8 illustrates a block diagram of one embodiment of a wind turbine controller according to the present disclosure.

In addition, as shown in FIGS. 6-8, the electrical power system 105 may include one or more controllers. For example, the electrical power system 105 may include a system-level controller (e.g. a farm-level controller 107), one or more cluster-level controllers 176, and/or one or more subsystem-level controllers (e.g. turbine-level controllers 136). As such, the various controllers described herein are configured to control any of the components of the wind farm 105, the wind turbine clusters 137, and/or the individual wind turbines 100 and/or implement the method steps as described herein. For example, as shown particularly in FIG. 8, a block diagram of one embodiment of a controller as described herein is illustrated. As shown, the controller may include one or more processor(s) 138 and associated memory device(s) 140 configured to perform a variety of computer-implemented functions (e.g., performing the methods, steps, calculations and the like and storing relevant data as disclosed herein). Additionally, the controller may also include a communications module 142 to facilitate communications between the controller and the various components of the wind farm 105, e.g. any of the components of FIGS. 6 and 7. Further, the communications module 142 may include a sensor interface 144 (e.g., one or more analog-to-digital converters) to permit signals transmitted from one or more sensors 139, 141, 143 to be converted into signals that can be understood and processed by the processors 138. It should be appreciated that the sensors 139, 141, 143 may be communicatively coupled to the communications module 142 using any suitable means. For example, as shown in FIG. 8, the sensors 139, 141, 143 may be coupled to the sensor interface 144 via a wired connection. However, in other embodiments, the sensors 139, 141, 143 may be coupled to the sensor interface 144 via a wireless connection, such as by using any suitable wireless communications protocol known in the art. As such, the processor 138 may be configured to receive one or more signals from the sensors 139, 141, 143.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 138 is also configured to compute advanced control algorithms and communicate to a variety of Ethernet or serial-based protocols (Modbus, OPC, CAN, etc.). Additionally, the memory device(s) 140 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 140 may generally be configured to store suitable computer-readable instructions that, when implemented by the processor(s) 138, configure the controller to perform the various functions as described herein.

Referring back to FIG. 6, in operation, alternating current (AC) power generated at the generator stator 120 by rotation of the rotor 104 is provided via a dual path to the grid, i.e. via the stator power path 125 and the converter power path 127. More specifically, the rotor side converter 124 converts the AC power provided from the generator rotor 118 into DC power and provides the DC power to the DC link 128. Switching elements (e.g. IGBTs) used in bridge circuits of the rotor side converter 124 can be modulated to convert the AC power provided from the generator rotor 118 into DC power suitable for the DC link 124. The line side converter 126 converts the DC power on the DC link 128 into AC output power suitable for the grid. In particular, switching elements (e.g. IGBTs) used in bridge circuits of the line side converter 126 can be modulated to convert the DC power on the DC link 128 into AC power. As such, the AC power from the power converter 122 can be combined with the power from the generator stator 120 to provide multi-phase power having a frequency maintained substantially at the frequency of the bus. It should be understood that the rotor side converter 124 and the line side converter 126 may have any configuration using any switching devices that facilitate operation of electrical power system 102 as described herein.

Further, the power converter 122 may be coupled in electronic data communication with the individual turbine controllers 136 and/or a separate or integral converter controller 154 to control the operation of the rotor side converter 124 and the line side converter 126. For example, during operation, the controller(s) 136 may be configured to receive one or more voltage and/or electric current measurement signals from the first set of voltage and electric current sensors 139, 141, 143. Thus, the controller(s) 136 may be configured to monitor and control at least some of the operational variables associated with the wind turbine 100 via the sensors 139, 141, 143. In the illustrated embodiment, the sensors 139, 141, 143 may be electrically coupled to any portion of electrical power subsystem 102 that facilitates operation of electrical power subsystem 102 as described herein.

It should also be understood that any number or type of voltage and/or electric current sensors may be employed within the wind turbine 100 and at any location. For example, the sensors may be current transformers, shunt sensors, rogowski coils, Hall Effect current sensors, Micro Inertial Measurement Units (MIMUs), or similar, and/or any other suitable voltage or electric current sensors now known or later developed in the art. Thus, the converter controller 154 is configured to receive one or more voltage and/or electric current feedback signals from the sensors 139, 141, 143. More specifically, in certain embodiments, the current or voltage feedback signals may include at least one of line feedback signals, line-side converter feedback signals, rotor-side converter feedback signals, or stator feedback signals.

Figure 4:
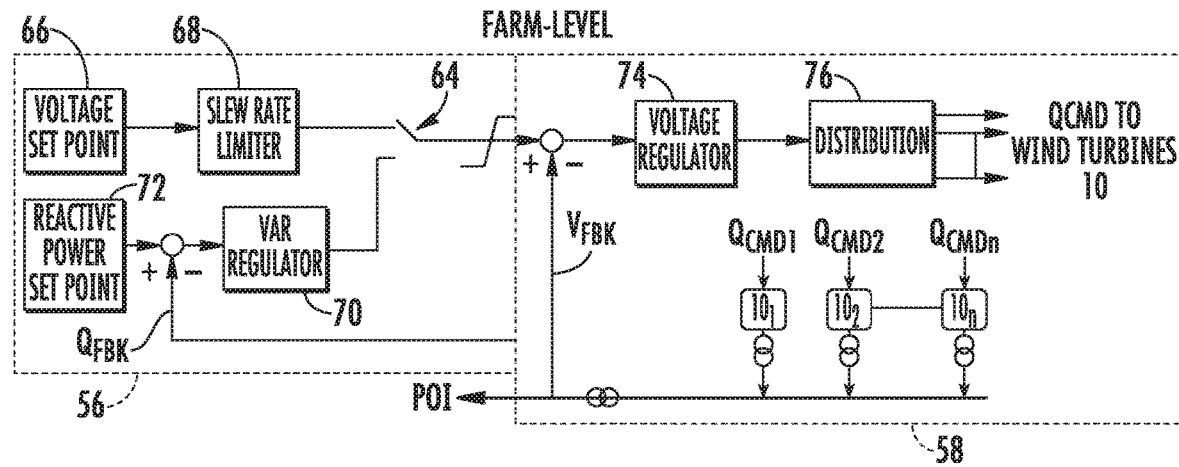
FIG. 4 illustrates a schematic diagram of one embodiment of a farm-level control scheme according to conventional construction.
Figure 5:
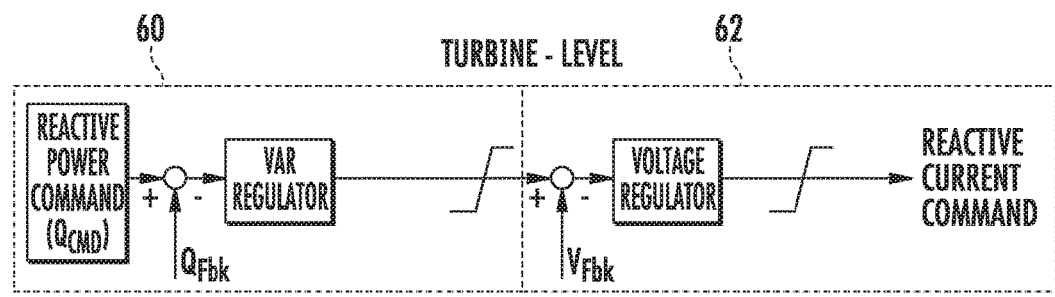
FIG. 5 illustrates a schematic diagram of one embodiment of a turbine-level control scheme according to conventional construction.

Referring particularly to FIG. 7, individual power systems (such as the power subsystem 102 illustrated in FIG. 4) may be arranged in at least two clusters 137 to form the electrical power system 105. More specifically, as shown, the wind turbine power systems 102 may be arranged into a plurality of clusters 137 (grouped together via dotted boxes) so as to form the wind farm 105. Thus, as shown, each cluster 137 may be connected to a separate transformer 145, 146, 147 via switches 150, 151, 152, respectively, for stepping up the voltage amplitude of the electrical power from each cluster 137 such that the transformed electrical power may be further transmitted to the power grid. In addition, as shown, the cluster transformers 145, 146, 147 are connected to a main line 148 that combines the voltage from each cluster 137 before sending the power to the grid. Further, as shown, each of the clusters 137 may be communicatively coupled with a cluster-level controller 176, e.g. as shown in FIG. 11 and further discussed below.

Figure 9:
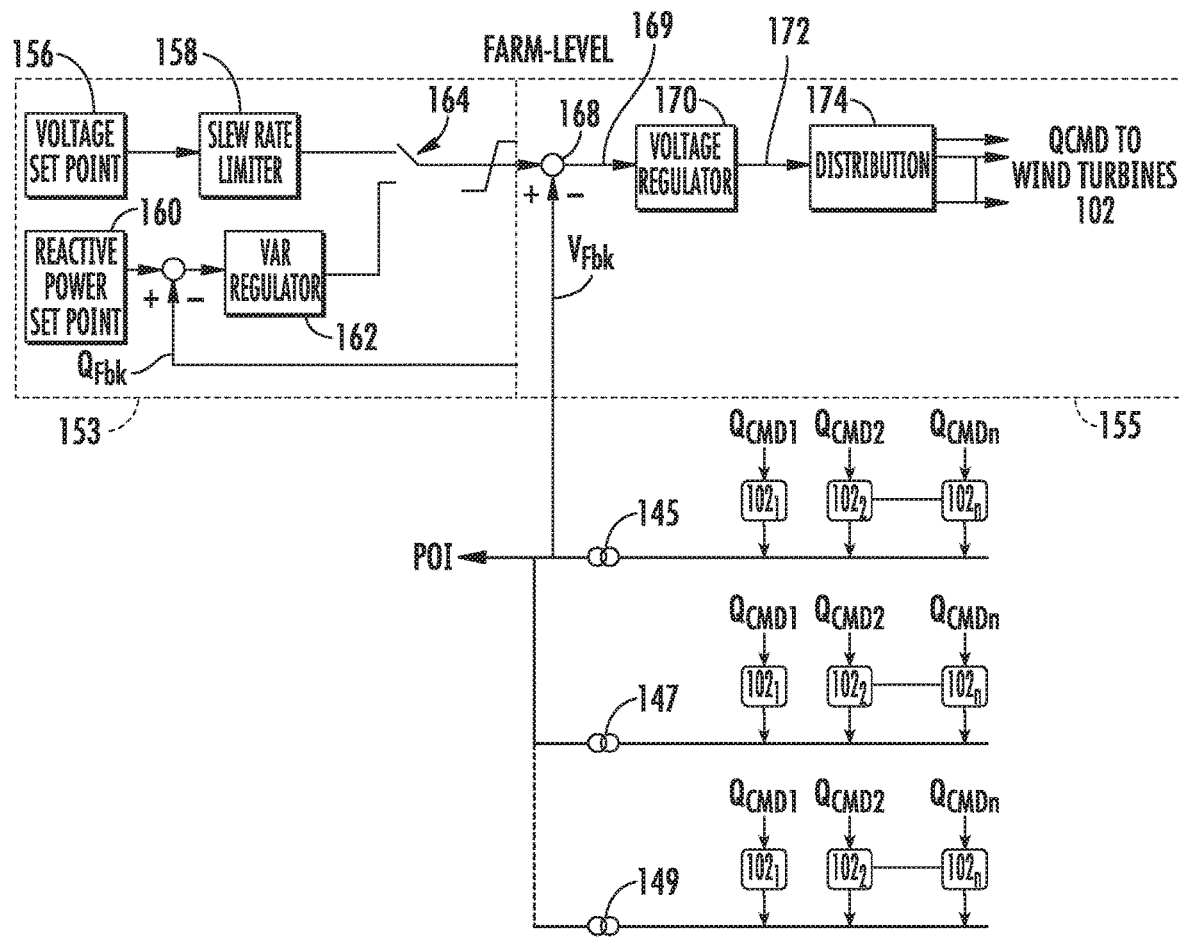
FIG. 9 illustrates a schematic diagram of one embodiment of a baseline farm-level control scheme according to the present disclosure.
Figure 10:
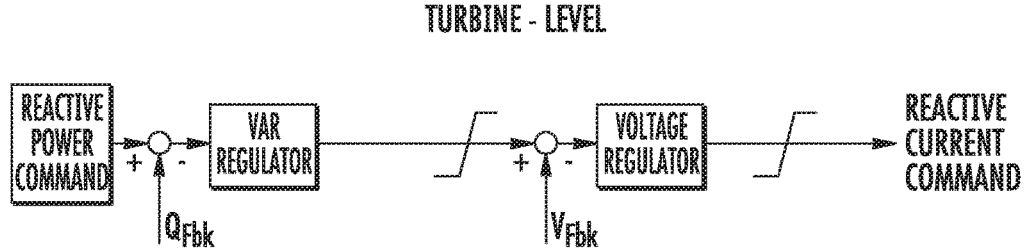
FIG. 10 illustrates a schematic diagram of one embodiment of a baseline turbine-level control scheme according to the present disclosure.
Figure 11:
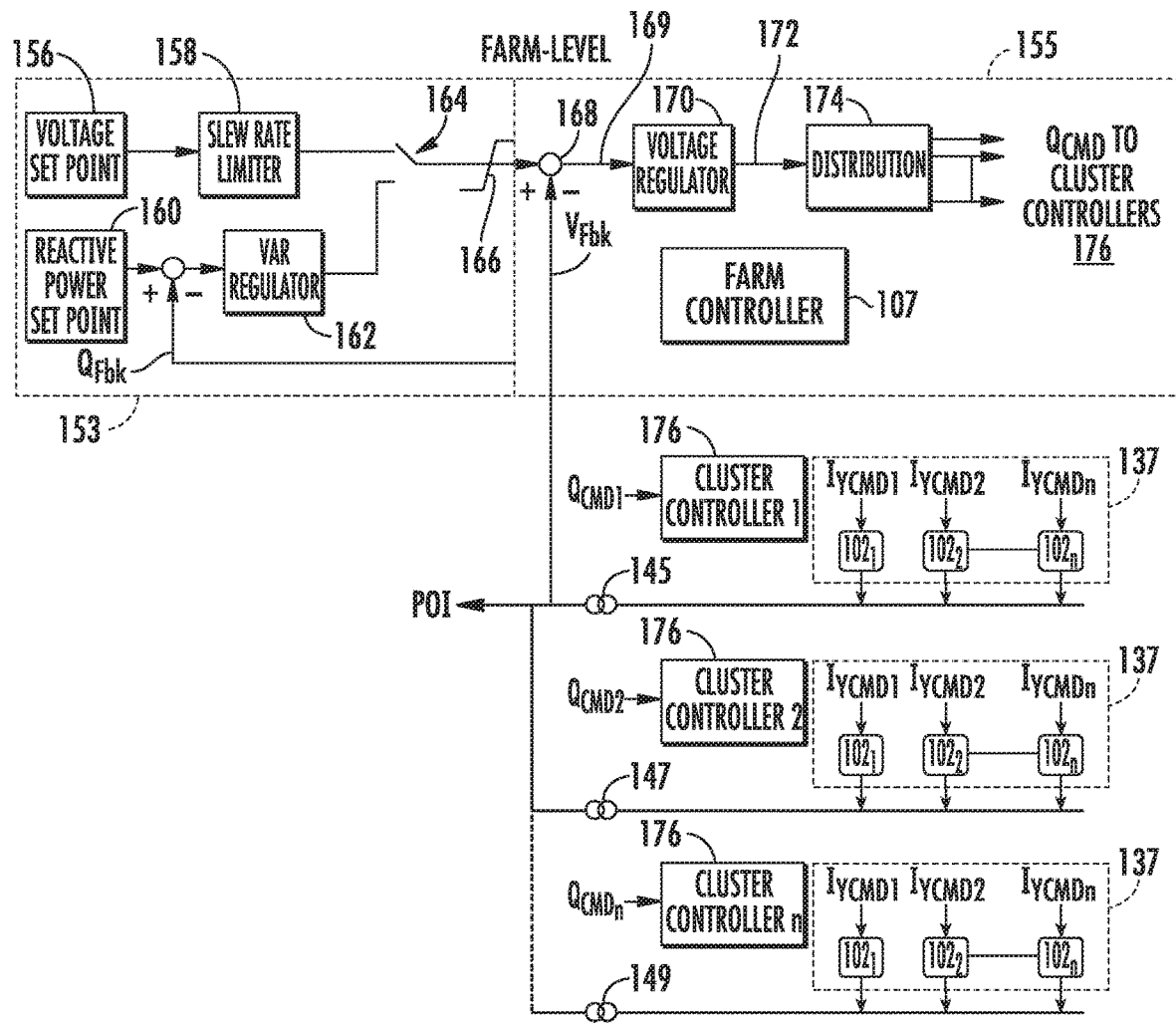
FIG. 11 illustrates a schematic diagram of one embodiment of a farm-level control scheme according to the present disclosure.
Figure 12:
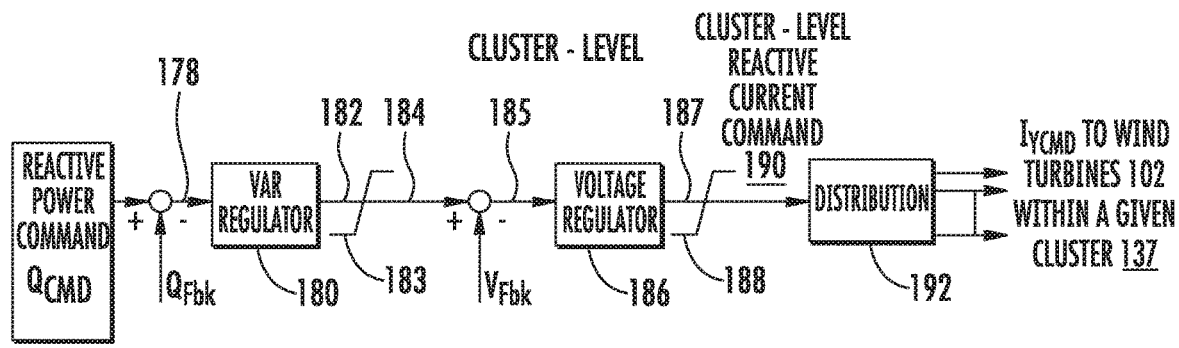
FIG. 12 illustrates a schematic diagram of one embodiment of a cluster-level control scheme according to the present disclosure.

Referring now to FIGS. 9-12, various illustrations are provided to further describe the systems and methods of the present disclosure. For example, FIG. 9 illustrates a schematic diagram of a baseline farm-level control scheme, whereas FIG. 10 illustrates a schematic diagram of one embodiment of a baseline turbine-level control scheme. However, due to the absence of impedance provided by the stator winding 35 in the main three-winding transformer 34, the goal of each wind turbine regulating its terminal voltage becomes difficult. More specifically, such systems (i.e. the systems illustrated in FIGS. 9 and 10) have been known to experience reactive power oscillations. Thus, FIG. 11 illustrates a schematic diagram of one embodiment of a farm-level control scheme according to the present disclosure; and FIG. 12 illustrates a schematic diagram of one embodiment of a cluster-level control scheme according to the present disclosure that address the issues associated with the turbine-level volt-VAR loop illustrated in FIG. 10.

More specifically, as shown in FIG. 11, the farm-level control scheme includes a fast inner voltage magnitude loop 155 and a slow outer reactive power loop 153. Further, as shown, the farm-level controller 107 alternates between voltage control and reactive power controller via switch 164. For voltage control, the farm-level controller 107 receives a voltage set point 156 and limits the set point via a slew rate limiter 158. For reactive power control, the farm-level controller 107 regulates the reactive power via a reactive power (VAR) regulator 162 based on a reactive power set point 160 and a reactive power feedback signal $Q_{FBK}$, e.g. from the power grid, e.g. at the primary side (i.e. the high voltage) of the farm substation transformers 145, 146, or 147 and/or at the secondary (i.e. medium voltage) of the farm substation transformers 145, 146, or 147. The farm-level controller 107 then limits either the voltage or reactive power signal that enters the fast inner voltage magnitude loop 155 via limiter 166. A voltage regulator 170 then regulates the voltage signal 169 to determine a reactive power command 172 for the wind farm 105. Thus, as shown at 174, the farm-level controller 107 then distributes the net reactive power command (Qom) to each of the cluster-level controller 176.

At the cluster-level, as shown in FIGS. 11 and 12, each of the cluster-level controllers 176 is configured to receive a reactive power command (i.e. $Q_{CMD1}$, $Q_{CMD2}$, $Q_{CMDn}$, and so on) from the farm-level controller 107. In addition, as shown in FIG. 12, the cluster-level controllers 176 also receive a reactive power feedback signal (e.g. $Q_{FBK}$) and determine a reactive power error 178 as a function of the reactive power command $Q_{CMD}$ for each cluster 137 and the reactive power feedback signal $Q_{FBK}$. Further, the cluster-level controllers 176 also generate a cluster-level reactive current command 188 for each cluster 137 of electrical power subsystems 102 based on the reactive power error 178. More specifically, in certain embodiments, the cluster-level controllers 176 may include a reactive power VAR regulator 180 configured to generate a first output 182 based on the reactive power error 178. For example, in certain embodiments, the reactive power regulator 180 may include a proportional integral (PI) controller, a proportional derivative (PD) controller, a proportional integral derivative (PID) controller, a state space controller, or another other suitable controller.

In further embodiments, as shown, the cluster-level controllers 176 may each include a limiter 183 configured to the first output 182 from the reactive power regulator 180, e.g. based on a maximum voltage condition and a minimum voltage condition to obtain a voltage value 184. As such, the cluster-level controllers 176 may also receive a voltage feedback signal $V_{FBK}$ from a secondary winding of the cluster transformer 130 or point of common coupling (designated in the figures as POI) and determine a voltage error 185 as a function of the voltage value 184 and the voltage feedback $V_{FBK}$. In addition, each cluster-level controller 176 may include a voltage regulator 186 configured to generate a second output 187 based on the voltage error 185. For example, in certain embodiments, the voltage regulator 186 may include a proportional integral (PI) controller, a proportional derivative (PD) controller, a proportional integral derivative (PID) controller, a state space controller, or another other suitable controller. In addition, as shown, the cluster-level controllers 176 may each include a limiter 188 configured to limit the second output 187 from the voltage regulator 186, e.g. based on a maximum current condition and a minimum current condition to obtain the cluster-level reactive current command 190. Thus, as shown at 192, the cluster-level controllers 176 are configured to distribute a subsystem-level reactive current command (e.g. $I_{YCMD}$) to the turbine-level controllers 136 of the wind turbine power systems 102 based on the cluster-level reactive current command 190.

Figure 13:
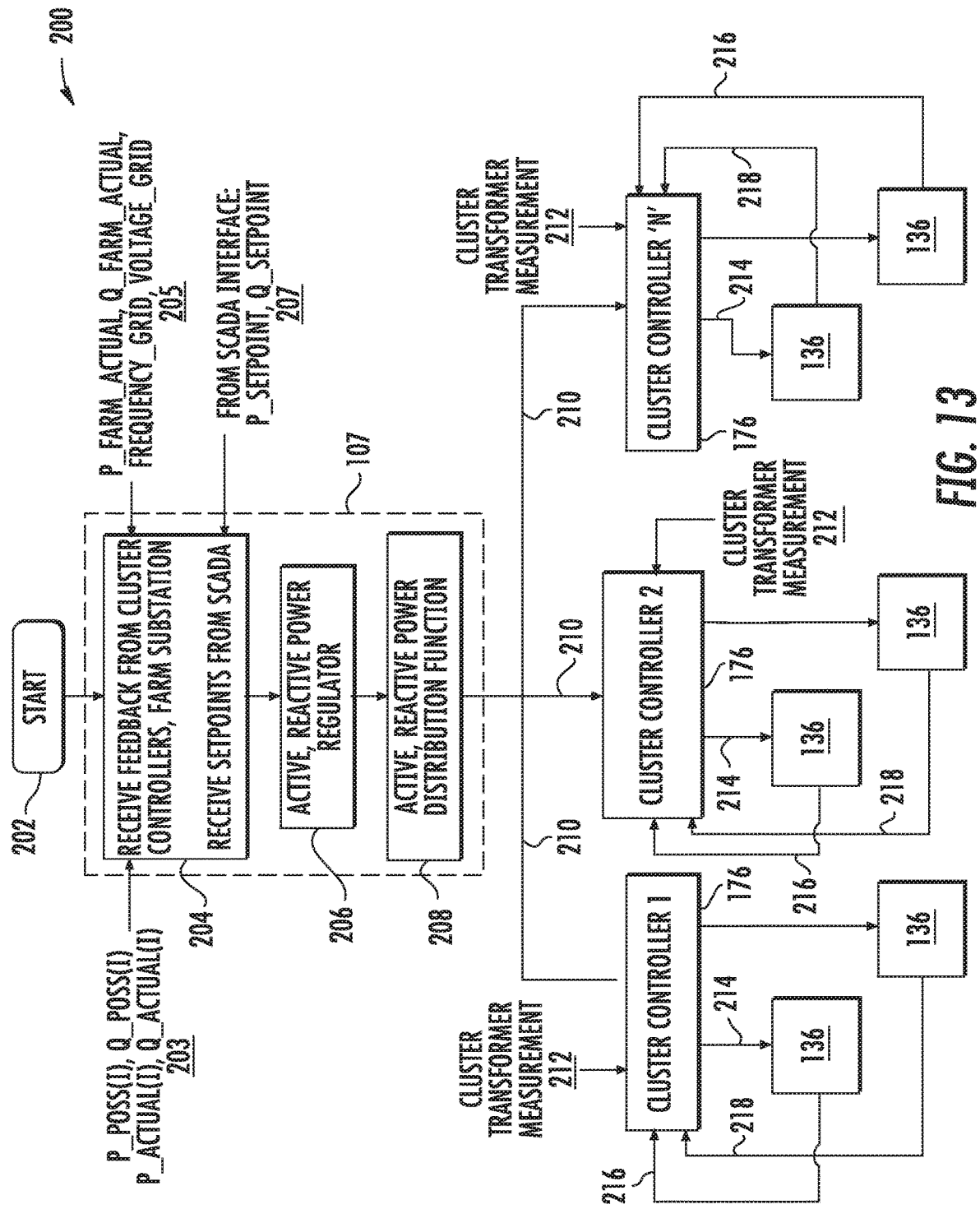
FIG. 13 illustrates a flow diagram of one embodiment of a method for controlling a wind farm via a farm-level controller according to the present disclosure.
Figure 14:
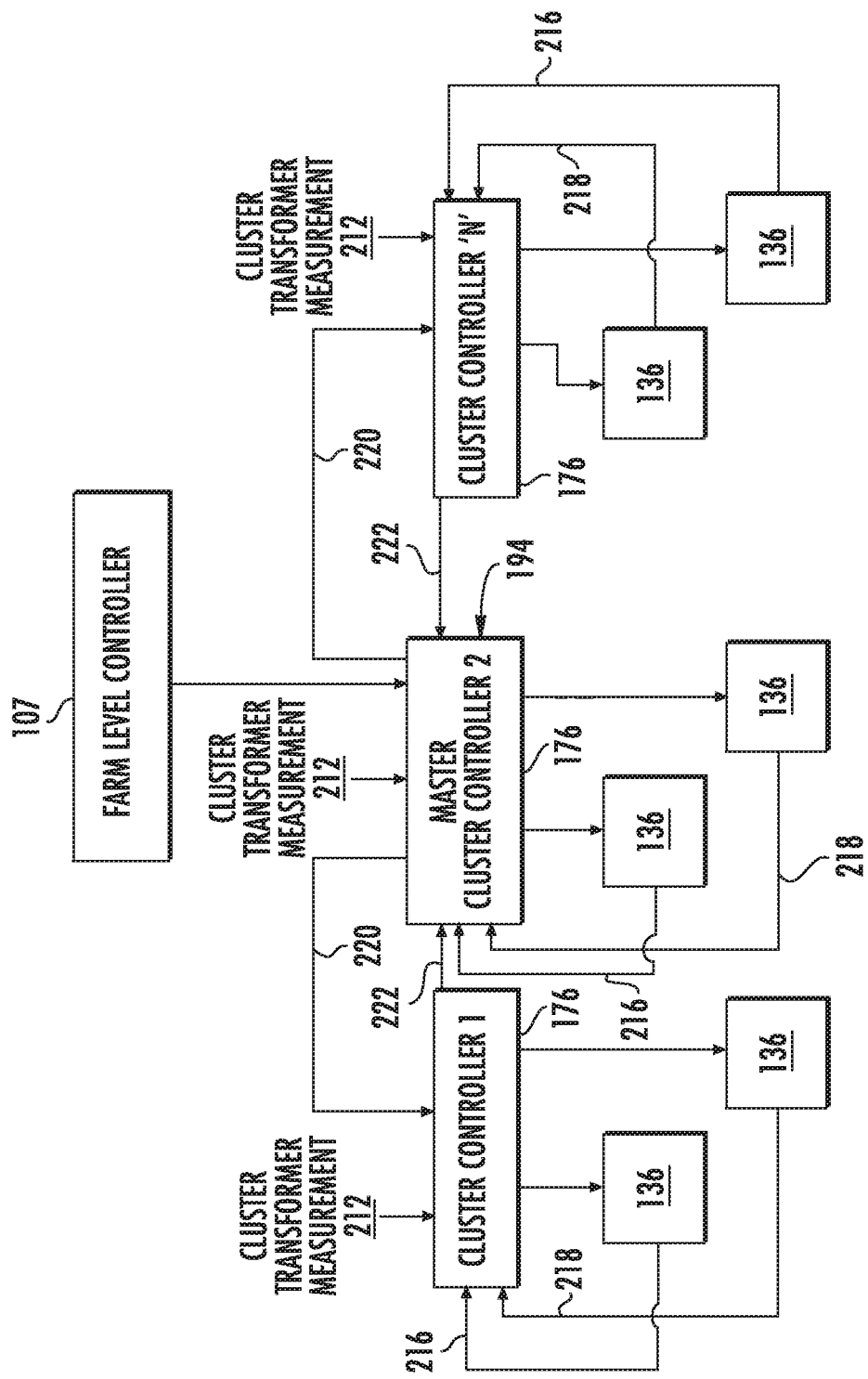
FIG. 14 illustrates a flow diagram of one embodiment of a method for controlling a wind farm via a master cluster-level controller when the farm-level controller is offline according to the present disclosure.

Referring now to FIGS. 13 and 14, flow diagram for various embodiments of methods 200, 300 for controlling the wind farm 105 as described herein are illustrated according to the present disclosure. More specifically, FIG. 13 illustrates a flow diagram of one embodiment for controlling the wind farm 105 when the farm-level controller is online. Alternatively, FIG. 14 illustrates a flow diagram of one embodiment for controlling the wind farm 105 when the farm-level controller is offline.

Referring particularly to FIG. 13, as shown at 202, the method 200 begins. As shown at 204, the farm-level controller 107 is configured to receive one or more feedback signals 203, 205, 207 from the cluster-level controllers 176 and/or the farm substation. For example, in one embodiment, the feedback signal(s) 203, 205 may include a farm-level real power (P_farm_actual), a farm-level reactive power (Q_farm_actual), a possible cluster actual power (P_poss(i)), a possible cluster reactive power (Q_poss(i)), a cluster-level real power (P_Actual(i)), a cluster-level reactive power Q_Actual(i), a cluster-level voltage measurement, or similar.

In addition, as shown, the farm-level controller 107 may also receive one or more set points 207 from a Supervisory Control and Data Acquisition (SCADA) control system and/or a system-level grid measurement (e.g. a grid frequency (e.g. frequency_grid), a grid voltage (e.g. voltage_grid), or similar). More specifically, in certain embodiments, the set point(s) may include a power set point (e.g. P_setpoint) and/or a reactive power set point (e.g. Q_setpoint).

In addition, as shown, the farm-level controller 107 may include an active, reactive power regulator 206 configured to regulate a system-level active power and/or a system-level reactive power based on required active power and required reactive power for the wind farm 105, respectively. More specifically, the active, reactive power regulator 206 is configured to compare the system-level active power or the system-level reactive power with preferred values for the system-level active power and the system-level reactive power, respectively.

In addition, the active, reactive power regulator 206 is configured to generate one or more cluster-level power commands 210 based on the comparison and the one or more feedback signals 203, 205, 207. More specifically, in one embodiment, the farm-level controller 107 may generate both cluster-level reactive power commands and/or cluster-level real or active power commands for each of the cluster-level controllers 176. For example, as shown at 208, the farm-level controller 107 may include utilize a distribution function based on one or more power ratios to determine the cluster-level power commands 210 for each cluster-level controller 176.

More specifically, given that each cluster 137 in the wind farm 105 is indexed by 'i' and the wind turbines within a cluster are indexed by 'j'—consequently (i,j) referring to the 'j'th turbine in cluster 'i', then the farm level command (taking the example of active power regulation) to each of the clusters can be determined based on Equation (1) below:

$$Pcmd_i = Psetpfarm * \frac{Pposs_i}{\sum_{i=1}^{n} Pposs_i} \qquad \text{Equation (1)}$$

Where
$Pcmd_i$ is the power command sent to cluster 'i' in the wind farm 105 from the farm-level controller 107;
Psetpfarm is the farm level active power setpoint after applying appropriate limits $Pposs_i$ is the possible power of cluster 'i' which indicates the potential active power that can be produced by the wind turbine within the cluster 'i' given the wind conditions; and n is the number of clusters 137 within the wind farm 105.

The distribution function of Equation (1) can be restricted to clusters 'i' such that a criterion is satisfied. For example, one option for the criterion is provided in Equation (2) below:

$$\frac{\sum Pposs_i - Psetpfarm}{Pposs_i} \geq \varepsilon \qquad \text{Equation (2)}$$

In other words, Equation (2) indicates that the ratio of possible power within a cluster to the actual power reduction is above a certain ratio. This criterion can be applied sequentially over each cluster 137 until the power reduction can be achieved by as few clusters as possible.

Further, Equation (3) below provides the equation for the possible power of cluster 'i' which indicates the potential active power that can be produced by the wind turbine within the cluster 'i' given the wind conditions:

$$Pposs_i = \Sigma_{j=1}^{m} Pturbposs_j \ \forall j \in \text{cluster } `i` \qquad \text{Equation (3)}$$

where
$Pturbposs_j$ is the possible power of turbine 'j'; and
m is the number of turbines in cluster 'i'.
A similar distribution approach can apply for reactive power.

Figure 15:
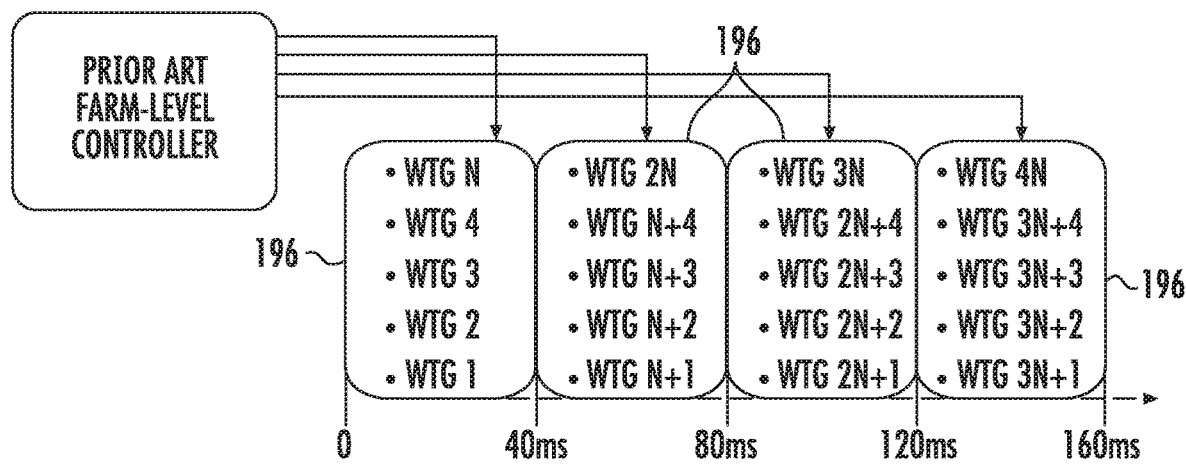
FIG. 15 illustrates a schematic diagram of one embodiment of a farm-level controller sending power commands directly to individual turbine controllers of a wind farm according to conventional construction.
Figure 16:
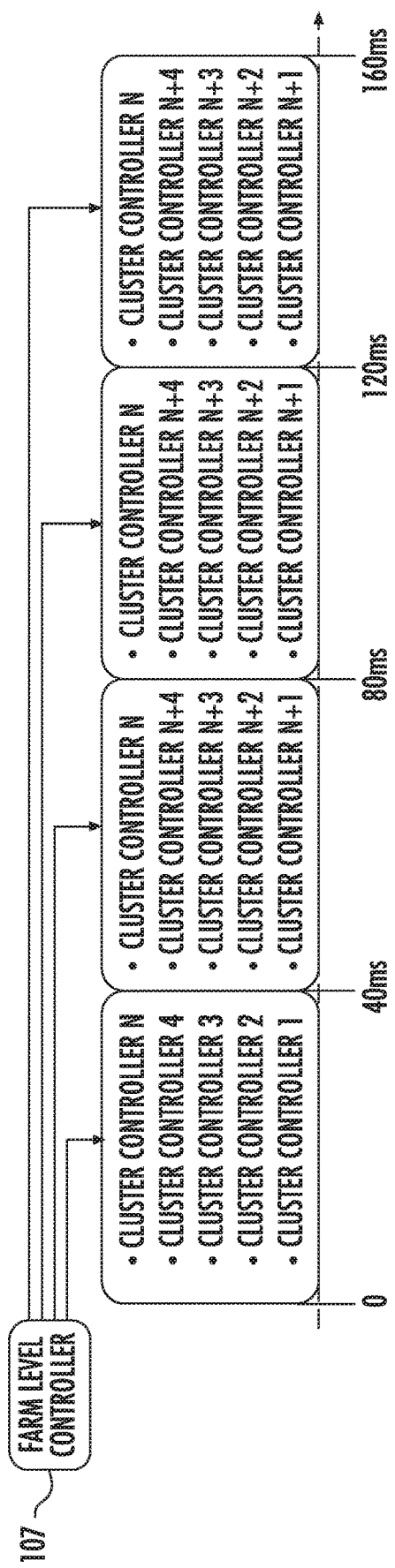
FIG. 16 illustrates a schematic diagram of one embodiment of a farm-level controller sending power commands to cluster-level controllers of a wind farm according to the present disclosure.
Figure 17:
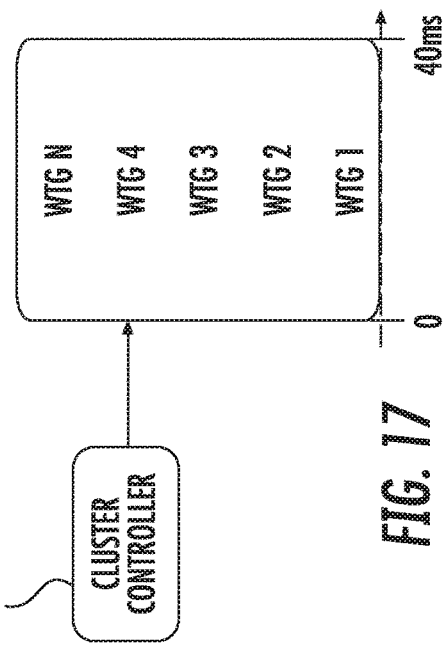
FIG. 17 illustrates a schematic diagram of one embodiment of a cluster-level controller sending power commands to individual turbine controllers of a wind farm according to the present disclosure.

Still referring to FIG. 13, the farm-level controller 107 is configured to send the cluster-level power commands 210 to each of the cluster-level controllers 176. More specifically, the farm-level controller 107 may send the cluster-level power commands 210 to the cluster-level controllers 176 in consecutive order. For example, FIGS. 15-17 illustrate various advantages of the wind turbine cluster arrangement over prior art systems that are not arranged in clusters. More particularly, FIG. 15 illustrates a system without a cluster arrangement, i.e. the farm-level controller 107 generates and sends power commands directly to individual groups 196 of wind turbine controllers. Such communication results in latency between each group 196 of wind turbines receiving commands from the farm-level controller 107. More specifically, in the illustrated embodiment, with 40 millisecond (ms) frame rate, a complete sweep of the wind farm 105 would take 320 ms. Therefore, the latency between the first group 196 of wind turbines and the last group will be 280 ms.

Alternatively, as shown in FIGS. 16 and 17, the farm-level controller 107 of the present disclosure sends data in discrete frames to each of the cluster transformers 176 to reduce network traffic on the wind farm 105. In addition, in the cluster-based control architecture, the farm-level controller 107 sends commands to the cluster-level controllers 176 instead of directly to the wind turbines 100. Thus, as shown in the illustrated embodiment, communication latency can be reduced significantly (e.g. close to a factor of 4×). Further, in certain embodiments, the farm-level controller 107 may select a subset of clusters 137 from the plurality of clusters of electrical power subsystems based on a frequency response of the power grid and only send the one or more cluster-level power commands to the subset of clusters 137.

Referring back to FIG. 13, in addition to receiving the power commands 210 from the farm-level controller 107, the cluster-level controllers 176 may be configured to receive at least one additional cluster transformer measurement 212, e.g. a voltage, current, or similar. Thus, as shown, each of the cluster-level controllers 176 may be configured to generate a cluster-level reactive current command ($I_{YCMD}$ 190, see FIGS. 11-12) for the wind turbines 100 is a given cluster 137 based on the farm-level power commands 210.

In additional embodiments, each of the cluster-level controllers 176 may be configured to receive at least one additional cluster transformer measurement 212. In such embodiments, each of the cluster-level controllers 176 may be configured to receive one or more feedback signals 216, 218 from each of the turbine-level controllers 136. Thus, as shown, the cluster-level controllers 176 generate one or more turbine power commands 214 based on the one or more farm-level power commands 210 and the at least one additional cluster transformer measurement 212 and send such commands to each of the turbine-level controllers 136. More specifically, as stated with respect to FIG. 12, the cluster-level controllers 176, the turbine power commands 214 may correspond to a cluster-level reactive current command.

Referring now to FIG. 14, the cluster-level controllers 176 can also act as a redundant wind controller in the event of the farm-level controller 107 is offline. In such an embodiment, one of the cluster-level controllers 176 may be selected as a master controller 194 in the event that the system-level controller 107 is offline. As such, the master controller 194 is configured to regulate the system-level active power and/or reactive power, e.g. using the same method described herein with respect to FIG. 13. For example, the master controller 194 is configured to regulate the system-level active power and/or reactive power based on required active power and required reactive power for the wind farm 105, respectively. In addition, the master controller 194 is configured to compare the system-level active power and/or the system-level reactive power with preferred values for the system-level active power and the system-level reactive power, respectively. Thus, as shown, the master controller 194 generates one or more cluster-level power commands 220 based on the comparison and one or more feedback signals 222 from other cluster-level controllers 176. Accordingly, the master controller 194, like the farm-level controller, is configured to consecutively send the cluster-level power commands 220 to the remaining cluster-level controllers 176.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An electrical power system farm connected to a power grid, comprising:
   a farm-level controller;
   a plurality of clusters of electrical power subsystems within the electrical power system farm, each of the electrical power subsystems comprising a subsystem controller and a power converter electrically coupled to a generator having a generator rotor and a generator stator, each of the electrical power subsystems defining a stator power path and a converter power path for providing power to the power grid, the converter power path comprising a partial power transformer;
   a cluster transformer connecting each cluster of electrical power subsystems to the power grid; and,
   a plurality of cluster-level controllers communicatively coupled with the farm-level controller, each of the cluster-level controllers communicatively coupled with the subsystem controllers of one of the clusters of electrical power subsystems, each of the clusters of electrical power subsystems communicatively coupled with one of the cluster-level controllers,
   the farm-level controller configured to perform one or more operations, the one or more operations comprising:
      regulating at least one of a system-level active power or a system-level reactive power of the electrical power system based on required active power and required reactive power for the electrical power system, respectively;
      comparing at least one of the system-level active power or the system-level reactive power with preferred values for the system-level active power and the system-level reactive power, respectively;
      receiving one or more feedback signals from each of the plurality of cluster-level controllers;
      generating one or more cluster-level power commands for the plurality of cluster-level controllers based on the comparison of at least one of the system-level active power or the system-level reactive power with preferred values for the system-level active power and the system-level reactive power, respectively, and the one or more feedback signals from each of the plurality of cluster-level controllers; and,
      sending the one or more cluster-level power commands to each of the plurality of cluster-level controllers.

2. The electrical power system of claim 1, wherein generating the one or more cluster-level power commands based on the comparison and the one or more feedback signals further comprises generating at least one of one or more cluster-level reactive power commands via a system-level reactive power regulator or one or more cluster-level real power commands for each of the cluster-level controllers.

3. The electrical power system of claim 2, further comprising a system-level limiter configured to limit an output from the system-level reactive power regulator.

4. The electrical power system of claim 1, wherein generating the one or more cluster-level power commands based on the comparison and the one or more feedback signals further comprises utilizing a distribution function based on one or more power ratios to determine the one or more cluster-level power commands for each cluster-level controller.

5. The electrical power system of claim 1, wherein the one or more operations further comprise selecting a subset of clusters from the plurality of clusters of electrical power subsystems based on a frequency response of the power grid and only sending the one or more cluster-level power commands to the subset of clusters.

6. The electrical power system of claim 1, wherein the one or more operations further comprise sending the one or more cluster-level power commands to the cluster-level controllers in consecutive order.

7. The electrical power system of claim 1, wherein each of the cluster-level controllers is configured to generate a cluster-level reactive current command for each cluster of electrical power subsystems based on the one or more cluster-level power commands.

8. The electrical power system of claim 1, wherein each of the cluster-level controllers is configured to receive at least one additional cluster transformer measurement.

9. The electrical power system of claim 8, wherein each of the cluster-level controllers is configured to receive one or more feedback signals from each of the subsystem-level controllers.

10. The electrical power system of claim 9, wherein each of the cluster-level controllers is configured to generate one or more subsystem power commands for each of the subsystem-level controllers based on the one or more cluster-level power commands and the at least one additional cluster transformer measurement.

11. The electrical power system of claim 1, wherein the one or more feedback signals comprise at least one of a system-level real power, a system-level reactive power, a cluster-level real power, a cluster-level reactive power, or a cluster-level voltage measurement.

12. The electrical power system of claim 1, wherein the one or more operations further comprise receiving at least one of one or more set points from a Supervisory Control and Data Acquisition (SCADA) control system or a system-level grid measurement comprising at least one of a grid frequency or a grid voltage, the one or more set points comprising at least one of a power set point or a reactive power set point.

13. The electrical power system of claim 1, wherein the electrical power system comprises a wind farm, and wherein the electrical power subsystems comprise wind turbine power systems.

14. A method for controlling an electrical power system, the electrical power system having a plurality of clusters of electrical power subsystems with a cluster transformer connecting each cluster of electrical power subsystems to a power grid, each of the electrical power subsystems having a subsystem controller and a power converter and defining a stator power path and a converter power path for providing power to the power grid, the converter power path containing a partial power transformer, the method comprising:
  in the event that a farm-level controller is offline, selecting one of a plurality of cluster-level controllers as a master controller, each of the plurality of cluster-level controllers communicatively coupled with the subsystem controllers of one of the clusters of electrical power subsystems;
  regulating, via the master controller, at least one of a system-level active power or a system-level reactive power of the electrical power system based on required active power and required reactive power for the electrical power system, respectively;
  comparing, via the master controller, at least one of the system-level active power or the system-level reactive power with preferred values for the system-level active power and the system-level reactive power, respectively;
  generating, via the master controller, one or more cluster-level power commands for the plurality of cluster-level controllers based on the comparison of at least one of the system-level active power or the system-level reactive power with preferred values for the system-level active power and the system-level reactive power, respectively, and one or more feedback signals from each of the plurality of cluster-level controllers; and,
  consecutively sending, via the master controller, the one or more cluster-level power commands to the remaining cluster-level controllers.

15. The method of claim 14, wherein generating the one or more cluster-level power commands based on the comparison and the one or more feedback signals further comprises generating at least one of one or more cluster-level reactive power commands via a system-level reactive power regulator or one or more cluster-level real power commands for each of the cluster-level controllers.

16. The method of claim 14, wherein generating the one or more cluster-level power commands based on the comparison and the one or more feedback signals further comprises utilizing a distribution function based on one or more power ratios to determine the one or more cluster-level power commands for each cluster-level controller.

17. The method of claim 14, further comprising selecting a subset of clusters from the plurality of clusters of electrical power subsystems based on a frequency response of the power grid and only sending the one or more cluster-level power commands to the subset of clusters.

18. The method of claim 14, wherein each of the cluster-level controllers is configured to generate a cluster-level reactive current command for each cluster of electrical power subsystems based on the one or more cluster-level power commands.

19. The method of claim 18, further comprising a subsystem-level controller communicatively coupled to each of the electrical power subsystems, wherein each of the cluster-level controllers is configured to receive one or more feedback signals from each of the subsystem-level controllers and generate one or more subsystem power commands for each of the subsystem-level controllers based on the one or more cluster-level power commands and at least one additional cluster transformer measurement.

20. A method for controlling an electrical power system, the method comprising:
  providing the electrical power system having a plurality of clusters of electrical power subsystems with a cluster transformer connecting each cluster of electrical power subsystems to a power grid, each of the electrical power subsystems having a subsystem controller and a power converter and defining a stator power path and a converter power path for providing power to the power grid, the converter power path containing a partial power transformer;
  regulating, via a farm-level controller, at least one of a system-level active power or a system-level reactive power of the electrical power system based on required active power and required reactive power for the electrical power system, respectively;
  comparing, via the farm-level controller, at least one of the system-level active power or the system-level reactive power with preferred values for the system-level active power and the system-level reactive power, respectively;
  receiving, via the farm-level controller, one or more feedback signals from a plurality of cluster-level controllers, each of the plurality of cluster-level controllers communicatively coupled with the subsystem controllers of one of the clusters of electrical power subsystems;
  generating, via the farm-level controller, one or more cluster-level power commands for the plurality of cluster-level controllers based on the comparison of at least one of the system-level active power or the system-level reactive power with preferred values for the system-level active power and the system-level reactive power, respectively, and the one or more feedback signals from each of the plurality of cluster-level controllers; and, sending, via the farm-level controller, the one or more cluster-level power commands to each of the cluster-level controllers.

* * * * *